US010620994B2

(12) United States Patent
Tye et al.

(10) Patent No.: US 10,620,994 B2
(45) Date of Patent: Apr. 14, 2020

(54) CONTINUATION ANALYSIS TASKS FOR GPU TASK SCHEDULING

(71) Applicant: Advanced Micro Devices, Inc., Sunnyvale, CA (US)

(72) Inventors: Steven Tony Tye, Hopkinton, MA (US); Brian L. Sumner, Bellevue, WA (US); Bradford Michael Beckmann, Redmond, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 204 days.

(21) Appl. No.: 15/607,991

(22) Filed: May 30, 2017

(65) Prior Publication Data
US 2018/0349145 A1 Dec. 6, 2018

(51) Int. Cl.
*G06F 9/48* (2006.01)
*G06F 9/38* (2018.01)
*G06F 9/50* (2006.01)
*G06F 9/52* (2006.01)

(52) U.S. Cl.
CPC .......... *G06F 9/4881* (2013.01); *G06F 9/3836* (2013.01); *G06F 9/3877* (2013.01); *G06F 9/505* (2013.01); *G06F 9/5083* (2013.01); *G06F 9/522* (2013.01); *G06F 9/3855* (2013.01)

(58) Field of Classification Search
None
See application file for complete search history.

(56) References Cited

U.S. PATENT DOCUMENTS

| 7,761,697 | B1 | 7/2010 | Coon et al. |
| 8,151,095 | B1 | 4/2012 | Wilt |
| 9,804,666 | B2 | 10/2017 | Jiao |
| 2006/0149941 | A1 | 7/2006 | Colavin et al. |
| 2011/0219221 | A1 | 9/2011 | Skadron et al. |
| 2012/0089792 | A1 | 4/2012 | Fahs et al. |

(Continued)

OTHER PUBLICATIONS

Hwu, Wen-mei W., "Heterogeneous System Architecture", Nov. 2015, Morgan Kaufmann, Chapter 6. (Year: 2015).*

(Continued)

*Primary Examiner* — Qing Yuan Wu
(74) *Attorney, Agent, or Firm* — Kowert Hood Munyon Rankin and Goetzel PC; Rory D. Rankin

(57) ABSTRACT

Systems, apparatuses, and methods for implementing continuation analysis tasks (CATs) are disclosed. In one embodiment, a system implements hardware acceleration of CATs to manage the dependencies and scheduling of an application composed of multiple tasks. In one embodiment, a continuation packet is referenced directly by a first task. When the first task completes, the first task enqueues a continuation packet on a first queue. The first task can specify on which queue to place the continuation packet. The agent responsible for the first queue dequeues and executes the continuation packet which invokes an analysis phase which is performed prior to determining which dependent tasks to enqueue. If it is determined during the analysis phase that a second task is now ready to be launched, the second task is enqueued on one of the queues. Then, an agent responsible for this queue dequeues and executes the second task.

16 Claims, 9 Drawing Sheets

(56) References Cited

U.S. PATENT DOCUMENTS

| | | |
|---|---|---|
| 2013/0042090 A1 | 2/2013 | Krashinsky |
| 2013/0117541 A1 | 5/2013 | Choquette et al. |
| 2013/0332702 A1 | 12/2013 | Boudier |
| 2014/0164737 A1 | 6/2014 | Collange et al. |
| 2014/0204103 A1 | 7/2014 | Beer-gingold et al. |
| 2014/0215187 A1 | 7/2014 | Yazdani |
| 2014/0259016 A1 | 9/2014 | Lottes et al. |
| 2014/0337389 A1* | 11/2014 | Ricketts ............... G06F 9/4881 707/803 |
| 2015/0220346 A1 | 8/2015 | Wang et al. |
| 2016/0085551 A1 | 3/2016 | Greathouse et al. |
| 2016/0103715 A1 | 4/2016 | Sethia et al. |
| 2017/0075734 A1 | 3/2017 | Raman |
| 2017/0278213 A1 | 9/2017 | Eckert et al. |
| 2018/0046577 A1 | 2/2018 | Chen et al. |
| 2018/0108109 A1 | 4/2018 | Zhan et al. |
| 2018/0239606 A1 | 8/2018 | Mantor et al. |

OTHER PUBLICATIONS

Brunie et al., "Simultaneous Branch and Warp Interweaving for Sustained GPU Performance", Proceedings of the 39th Annual International Symposium on Computer Architecture, Jun. 9, 2012, pp. 49-60, https://hal-ens-lyon.archives-ouvertes.fr/ensl-00649650/file/sbiswi.pdf. [Retrieved May 17, 2018].

Fung et al. "Dynamic Warp Formation and Scheduling for Efficient GPU Control Flow", Proceedings of the 40th Annual IEEE/ACM International Symposium on Microarchitecture, Dec. 1, 2007, 12 pages, https://www.ece.ubc.ca/~aamodt/papers/wwlfung.micro2007.pdf. [Retrieved May 17, 2018].

Ino et al., "Cooperative Multitasking for GPU-Accelerated Grid Systems", Concurrency and Computation: Practice and Experience, Jan. 2012, pp. 96-107, vol. 24, Issue 1, https://pdfs.semanticscholar.org/6d21/d8bb5419e94c9dfd85c1619b21ec65f93914.pdf. [Retrieved May 17, 2018].

Jog et al., "OWL: Cooperative Thread Array Aware Scheduling Techniques for Improving GPGPU Performance", Proceedings of the 18th International Conference on Architectural Support for Programming Languages and Operating Systems, Mar. 16, 2013, pp. 395-406, http://www.danielwong.org/classes/_media/ee260_w17/owl.pdf. [Retrieved May 17, 2018].

Kulkarni et al., "Scheduling Strategies for Optimistic Parallel Execution of Irregular Programs", Proceedings of the 20th Annual Symposium on Parallelism in Algorithms and Architectures, Jun. 1, 2008, pp. 217-228, https://www.cs.cornell.edu/~kb/publications/SPAA08.pdf. [Retrieved May 17, 2018].

Lee et al., "CAWS: Criticality-Aware Warp Scheduling for GPGPU Workloads", Proceedings of the 23rd International Conference on Parallel Architectures and Compilation, Aug. 24, 2014, pp. 175-186, http://faculty.engineering.asu.edu/carolewu/wp-content/uploads/2012/12/PACT14_CAWS_Lee_final.pdf. [Retrieved May 17, 2018].

"Multi-Process Service", NVIDIA Corporation, Oct. 2017, 28 pages, https://docs.nvidia.com/deploy/pdf/CUDA_Multi_Process_Service_Overview.pdf. [Retrieved May 17, 2018].

Narasiman et al., "Improving GPU Performance via Large Warps and Two-Level Warp Scheduling", Proceedings of the 44th Annual IEEE/ACM International Symposium on Microarchitecture, Dec. 3, 2011, pp. 308-317, https://users.ece.cmu.edu/~omutlu/pub/large-gpu-warps_micro11.pdf. [Retrieved May 17, 2018].

Park et al., "Chimera: Collaborative Preemption for Multitasking on a Shared GPU", Proceedings of the 20th International Conference on Architectural Support for Programming Languages and Operating Systems, Mar. 14, 2015, pp. 593-606, http://cccp.eecs.umich.edu/papers/jasonjk-asplos15.pdf. [Retrieved May 17, 2018].

Rogers et al., "Cache-Conscious Wavefront Scheduling". Proceedings of the 45th Annual IEEE/ACM International Symposium on Microarchitecture, Dec. 1, 2012, 12 pages, https://www.ece.ubc.ca/~aamodt/papers/tgrogers.micro2012.pdf. [Retrieved May 17, 2018].

Rogers et al., "Divergence-Aware Warp Scheduling", Proceedings of the 46th Annual IEEE/ACM International Symposium on Microarchitecture, Dec. 7, 2013, pp. 99-110, https://www.ece.ubc.ca/~aamodt/papers/tgrogers.micro2013.pdf. [Retrieved May 17, 2018].

Wang et al., "Exploiting Concurrent Kernel Execution on Graphic Processing Units", International Conference on High Performance Computing and Simulation, Aug. 2011, pp. 24-32.

European Search Report in European Application No. 17159105.0, dated Sep. 19, 2017, 4 pages.

Communication pursuant to Article 94(3) EPC in European Application No. 17159105.0, dated Nov. 21, 2017, 10 pages.

Communication pursuant to Article 94(3) EPC in European Application No. 17159105.0, dated Jul. 2, 2018, 7 pages.

Meng et al., "Dynamic Warp Subdivision for Integrated Branch and Memory Divergence Tolerance", Proceedings of the 37th Annual International Symposium on Computer Architecture, Jun. 19, 2010, pp. 235-246.

Brunie et al., "Simultaneous Branch and Warp Interweaving for Sustained GPU Performance", Jun. 11, 2012, 36 pages.

Volkov, Vasily, "Understanding Latency Hiding on GPUs", Technical Report No. UCB/EECS-2016-143, Aug. 12, 2016, 128 pages, https://www2.eecs.berkeley.edu/Pubs/TechRpts/2016/EECS-2016-143.pdf.

International Search Report and Written Opinion in International Application No. PCT/US2018/019026, dated May 7, 2018, 9 pages.

Puthoor et al., U.S. Appl. No. 15/993,061, entitled "Multi-Kernel Wavefront Scheduler", filed May 30, 2018, 31 pages.

Liu et al., "SAWS: Synchronization Aware GPGPU Warp Scheduling for Multiple Independent Warp Schedulers", 48th Annual IEEE/ACM International Symposium on Microarchitecture, Dec. 5, 2015, pp. 383-394.

International Search Report and Written Opinion in International Application No. PCT/US2018/034601, dated Sep. 5, 2018, 12 pages.

Non-Final Office Action in U.S. Appl. No. 15/439,540, dated Oct. 5, 2018, 12 pages.

Final Office Action in U.S. Appl. No. 15/439,540, dated May 1, 2019, 9 pages.

International Search Report and Written Opinion in International Application No. PCT/US2019/024354, dated Jun. 25, 2019, 13 pages.

Lee et al., "Improving GPGPU resource utilization through alternative thread block scheduling", 2014 IEEE 20th International Symposium on High Performance Computer Architecture (HPCA), Feb. 15, 2014, pp. 268-271.

Yoon et al., "Dynamic Resizing on Active Warps Scheduler to Hide Operation Stalls on GPUs", IEEE Transactions on Parallel and Distributed Systems, Nov. 2017, pp. 3142-3156, vol. 28, No. 11.

Yu et al., "A Stall-Aware Warp Scheduling for Dynamically Optimizing Thread-level Parallelism in GPGPUs", Proceedings of the 29th ACM on International Conference on Supercomputing, Jun. 8, 2015, pp. 15-24.

Rogers et al., "Cache-Conscious Wavefront Scheduling", Proceedings of the 2012 45th Annual IEEE/ACM International Symposium on Microarchitecture, Dec. 1, 2012, 12 pages.

* cited by examiner

CONTINUATION ANALYSIS TASKS FOR GPU TASK SCHEDULING

BACKGROUND

Description of the Related Art

Task parallel applications are becoming increasingly popular in the high-performance computing (HPC) domain because of their ability to effectively utilize parallel execution resources. However, one of the challenges with task parallel applications is efficiently managing dependencies. Current dependency tracking and resolution methods, such as the heterogeneous system architecture's (HSA's) architected queuing language (AQL) barrier packets or software-managed centralized dependency tracking tables, are not efficient. Specifically, while AQL barrier packets are directly executed by a graphic processing unit's (GPU's) command processors, the packets themselves can block task queues and necessitate careful queue management. Meanwhile, current software dependency tracking solutions require the host central processing unit (CPU) threads to get involved in GPU scheduling, which prevents low-latency dispatch of dependent tasks. In addition, some software dependency tracking solutions use centralized tracking tables that do not scale.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
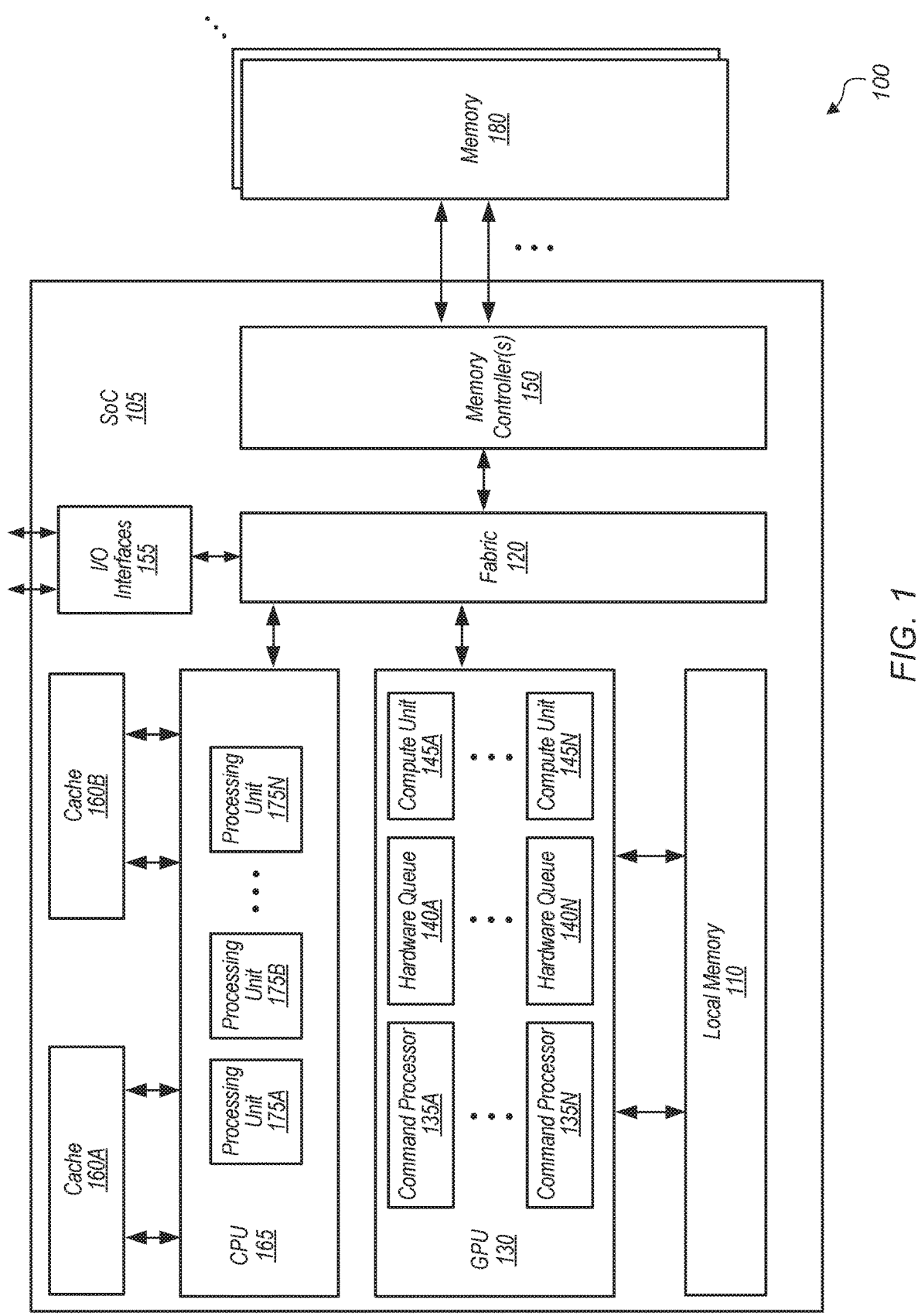
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing continuation analysis tasks (CATs) are disclosed herein. In one embodiment, a system includes a plurality of command processors, a plurality of queues, and a plurality of compute units. In one embodiment, the system is configured to implement hardware acceleration of CATs that are designed to handle the dependencies and scheduling of an application composed of multiple tasks. A CAT can be referenced directly by the data structure that specifies its parent task, by an AQL packet, or the CAT can be tied to a signal.

In various embodiments, the command processors are configured to launch a plurality of threads on the plurality of compute units, wherein a given task can include multiple threads. When a first task completes, the first task enqueues a continuation packet on a given queue. In one embodiment, the first task specifies on which queue to place the continuation packet. At a later point in time, a command processor dequeues the continuation packet and performs one or more actions specified by the continuation packet. An action that is specified by the continuation packet can be referred to herein as a "task". In one embodiment, if the task is a fixed function action, then the packet is an agent dispatch packet that includes a code which indicates which fixed function to perform. The fixed function can be performed by dedicated hardware or microcode, or the fixed function could be implemented by a software emulated queue on a CPU. If the task is an application action, then the packet is a kernel dispatch packet that references a kernel that performs the task. In other embodiments, other types of packets can be utilized.

In another embodiment, when the first task completes, an interrupt is generated to launch a continuation action. For example, in this embodiment, when the first task completes, the first task generates an interrupt to a given hardware unit that will respond with an action specified by the payload of the interrupt. The action can involve launching an analysis task, performing a fixed function, and/or other tasks.

When the continuation packet launches a CAT to perform an analysis phase, the specific types of actions that are performed during the analysis phase can vary from embodiment to embodiment. In one embodiment, the analysis phase can include determining which tasks are ready to be launched now that the first task has been completed. If it is determined during the analysis phase that a second task, which is dependent on the first task, is ready to be launched, the second packet, corresponding to the second task, is enqueued on a specified queue of the plurality of queues. Then, a command processor dequeues and executes the second packet which launches the second task. In another embodiment, the analysis phase can result in determining that a plurality of tasks are now ready to be launched, and a plurality of packets can be enqueued on specified queues to cause these plurality of tasks to be launched.

Referring now to FIG. 1, a block diagram of one embodiment of a computing system 100 is shown. In one embodiment, computing system 100 includes system on chip (SoC) 105 coupled to memory 180. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 150. SoC 105 can also include other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP)). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of system 100, such as an operating system. Generally, software executed by processing units 175A-N during use can control the other components of system 100 to realize the desired functionality of system 100. Processing units 175A-N can also execute other software, such as application programs.

In one embodiment, GPU 130 is configured to execute graphics pipeline operations such as draw commands, pixel operations, geometric computations, rasterization operations, and other operations for rendering an image to a display. In another embodiment, GPU 130 is configured to execute operations unrelated to graphics. In a further embodiment, GPU 130 is configured to execute both graphics operations and non-graphics related operations.

GPU 130 includes at least command processors 135A-N, hardware queues 140A-N, and compute units 145A-N. It should be understood that the number of command processors can be different than the number of hardware queues as well as different from the number of compute units. It should also be understood that the appearance of a one-to-one correspondence between command processor, hardware queue, and compute unit is not necessary and is shown merely for ease of illustration. Command processors 135A-N are representative of any number and type of command processors for retrieving and executing packets from hardware queues 140A-N. In one embodiment, a "packet" is defined as a memory buffer encoding a single command. Different types of packets can be stored in hardware queues 140A-N. For example, a packet for dispatching a kernel is referred to as a "kernel dispatch packet".

Compute units 145A-N are representative of any number and type of compute units that are used for graphics or general-purpose processing. Each compute unit 145A-N includes any number of execution units, with the number of execution units per compute unit varying from embodiment to embodiment. In some embodiments, compute units may be virtual (e.g., virtual machines). Various such embodiments are possible and are contemplated. GPU 130 is coupled to local memory 110 and fabric 120. In one embodiment, local memory 110 is implemented using high-bandwidth memory (HBM). The combination of local memory 110 and memory 180 can be referred to herein as a "memory subsystem". Alternatively, either local memory 110 or memory 180 can be referred to herein as a "memory subsystem".

In one embodiment, a first task specifies a continuation packet to be enqueued on a specified queue when the first task completes execution. It is noted that a "task" can also be referred to as a "kernel". As used herein, the term "continuation packet" is defined as a unit of data encoding one or more commands and/or a pointer to executable code. In one embodiment, a "continuation packet" is defined as a packet which is enqueued on a specified queue in response to a first task completing, with the packet causing one or more continuation actions to be performed in response to being dequeued from the specified queue. A packet which launches the first task, when the packet is dequeued, can be referred to herein as an "ordinary packet" to differentiate from a "continuation packet". In one embodiment, an ordinary packet contains or references a continuation packet and a target queue ID. When the task specified in the ordinary packet completes, the continuation packet will automatically be enqueued on the target queue.

When the first task is completed, the continuation packet is enqueued on one of hardware queues 140A-N. The continuation packet can also be enqueued on AQL queues of other agents, including an AQL queue of CPU 165. It is noted that an AQL queue can be mapped to a hardware queue by the scheduler. In one embodiment, the first task specifies which hardware queue of hardware queues 140A-N for enqueuing the continuation packet. Then, after the continuation packet is enqueued, a command processor of command processors 135A-N dequeues and executes the continuation packet. In one embodiment, the continuation packet launches a CAT which performs one or more functions prior to enqueuing a second task on one of hardware queues 140A-N. These function(s) perform actions, which can include enqueuing further tasks. These function(s) can also perform other types of actions, such as atomically updating global memory data structures that are inspected by future CATs. In one embodiment, the CAT determines if all dependencies have been satisfied to allow the second task and any additional tasks to be executed.

In another embodiment, the CAT determines the current workload of compute units 145A-N and/or processing units 175A-N (of CPU 165) and assigns the second task and any additional tasks to specific queue(s) with the goal of balancing the load across compute units 145A-N and/or processing units 175A-N. It is noted that the given queue will be processed by a command processor that is responsible for dispatching kernels on a specific compute unit or processing unit. In a further embodiment, the CAT determines which tasks are on the critical path, and then the CAT causes the tasks to be enqueued in an order based on prioritizing tasks which are on the critical path.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 180, which includes one or more memory modules. Each of the memory modules includes one or more memory devices mounted thereon. In some embodiments, memory 180 includes one or more memory devices mounted on a motherboard or other carrier upon which SoC 105 is also mounted. In one embodiment, memory 180 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 180 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 175A-N and/or compute units 145A-N. In some embodiments, SoC 105 includes caches 160A-B that are utilized by processing units 175A-N. It is noted that caches 160A-B are representative of any number of caches that can be included in SoC 105. In one embodiment, caches 160A-B are part of a cache subsystem including a cache controller.

It is noted that the letter "N" when displayed herein next to various structures is meant to generically indicate any number of elements for that structure (e.g., any number of processing units 175A-N in CPU 165, including one processing unit). Additionally, different references within FIG. 1 that use the letter "N" (e.g., compute units 145A-N) are not intended to indicate that equal numbers of the different elements are provided (e.g., the number of processing units 175A-N in CPU 165 can differ from the number of compute units 145A-N of GPU 130).

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. It is also noted that computing system 100 and/or SoC 105 can include other components not shown in FIG. 1. Additionally, in other embodiments, computing system 100 and SoC 105 can be structured in other ways than shown in FIG. 1.

Figure 2:
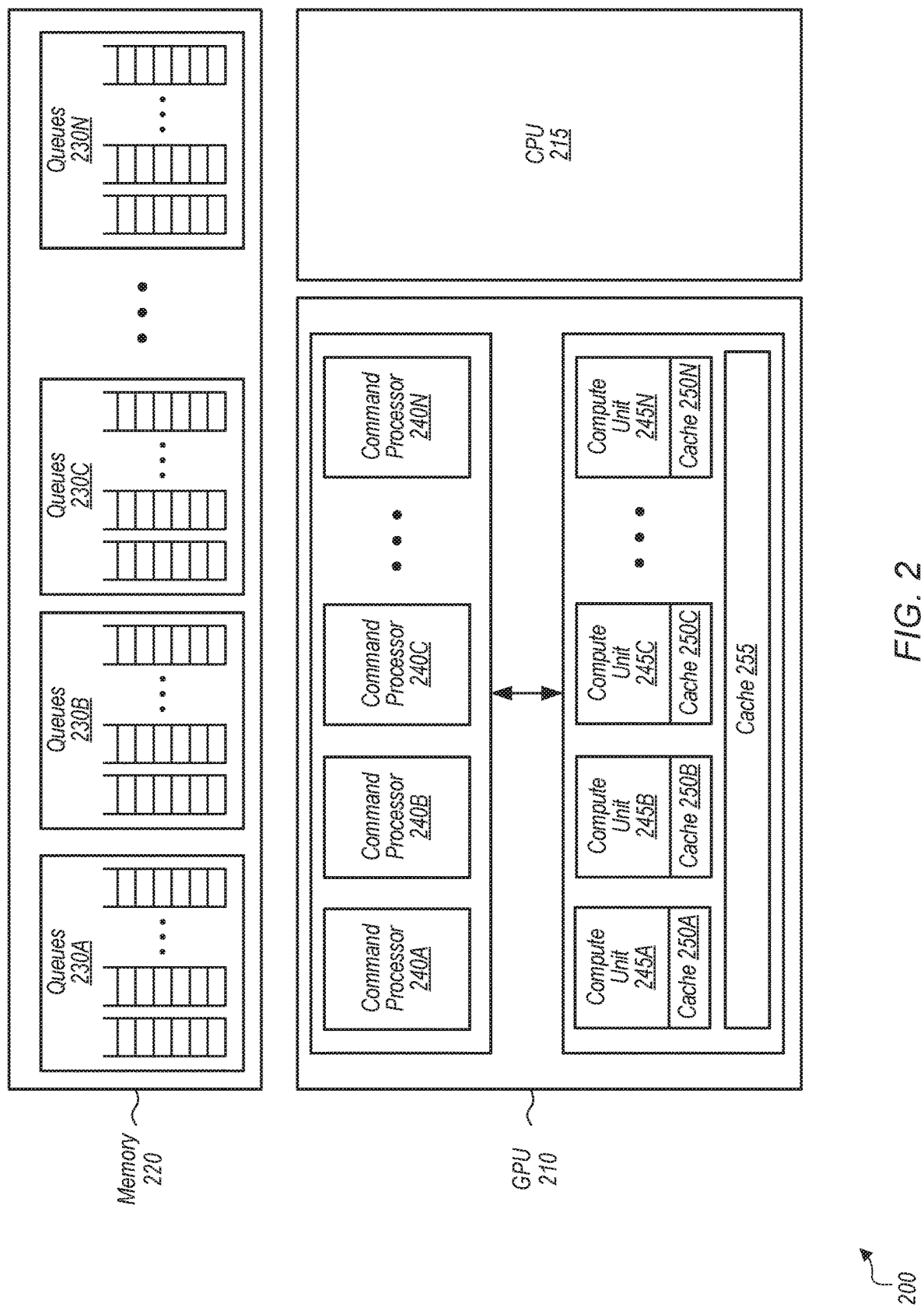
FIG. 2 is a block diagram of another embodiment of a computing system.

Turning now to FIG. 2, a block diagram of another embodiment of a computing system 200 is shown. Computing system 200 includes at least GPU 210, CPU 215, and memory 220. Memory 220 is representative of any number and type of memory devices accessible by GPU 210 and CPU 215. Command processors 240A-N are representative of any number and type of command processors. In one embodiment, each command processor 240A-N is equivalent to the other command processors 240A-N. In another embodiment, different types of command processors are included among command processors 240A-N. Each command processor 240A-N is configured to retrieve a packet from a corresponding set of queues 230A-N and process the packet. If the packet is a kernel dispatch packet, then command processor 240A-N is configured to initiate the kernel on one or more of compute units 245A-N.

Compute units 245A-N are representative of any number and type of compute units. Each compute unit 245A-N includes any number of execution units, with the number of execution units varying from embodiment to embodiment. In one embodiment, each compute unit 245A-N includes or is coupled to a corresponding cache 250A-N. Also, compute units 245A-N are coupled to a shared cache 255. In other embodiments, compute units 245A-N can access other types of caches structures and/or memory subsystems.

Queues 230A-N are representative of any number and type of queues which are allocated in memory 220. Each set of queues 230A-N includes any number of queues. In one embodiment, the packets stored in each queue of queues 230A-N are processed in order. Accordingly, in this embodiment, each queue of queues 230A-N is treated as a first-in, first-out (FIFO) queue. In one embodiment, different ones of queues 230A-N are configured to store different types of packets. A packet is a memory buffer encoding one or more commands, and the packet can also include a pointer to executable code stored elsewhere in memory 220. In one embodiment, a packet (e.g., an AQL packet) includes a single command.

In one embodiment, each queue 230A-N is assigned to a separate one of command processors 240A-N. For example, in this embodiment, packets stored in queues 230A are retrieved and processed by command processor 240A, packets stored in queues 230B are retrieved and processed by command processor 240B, and so on. Additionally, in one embodiment, one or more of the sets of queues 230A-N are monitored by a command processor which dispatches tasks to CPU 215.

When a given task finishes execution on system 200, the given task can enqueue a continuation packet. The given task references the continuation packet and specifies the queue of queues 230A-N on which the continuation packet should be enqueued. Then, in one embodiment, a CAT will be launched when the continuation packet is processed by the agent responsible for the queue storing the continuation packet. Depending on the embodiment, the CAT can initiate one or more functions when the continuation packet is selected out of the queue by a corresponding command processor 240A-N. In one embodiment, the CAT determines which tasks are ready to execute now that the previous task has been completed. For example, in this embodiment, the CAT can check for various dependencies and determine if any tasks are ready to execute. If the CAT determines that a given task is now ready to be executed, the CAT enqueues the given task on an appropriate queue of queues 230A-N.

In another embodiment, the CAT executes an analysis phase. For example, the CAT can perform a load balancing analysis to determine the state of the system and determine on which of the compute units and/or CPU a dependent task should be executed based on the state of the system. In other embodiments, the CAT can initiate other types of functions.

In a further embodiment, a CAT is identified by the original task, and when the original task is completed, an interrupt is generated to start the identified CAT. In this embodiment, the CAT is stored in a location in memory 220, and the interrupt includes a pointer to the address of the CAT.

Figure 3:
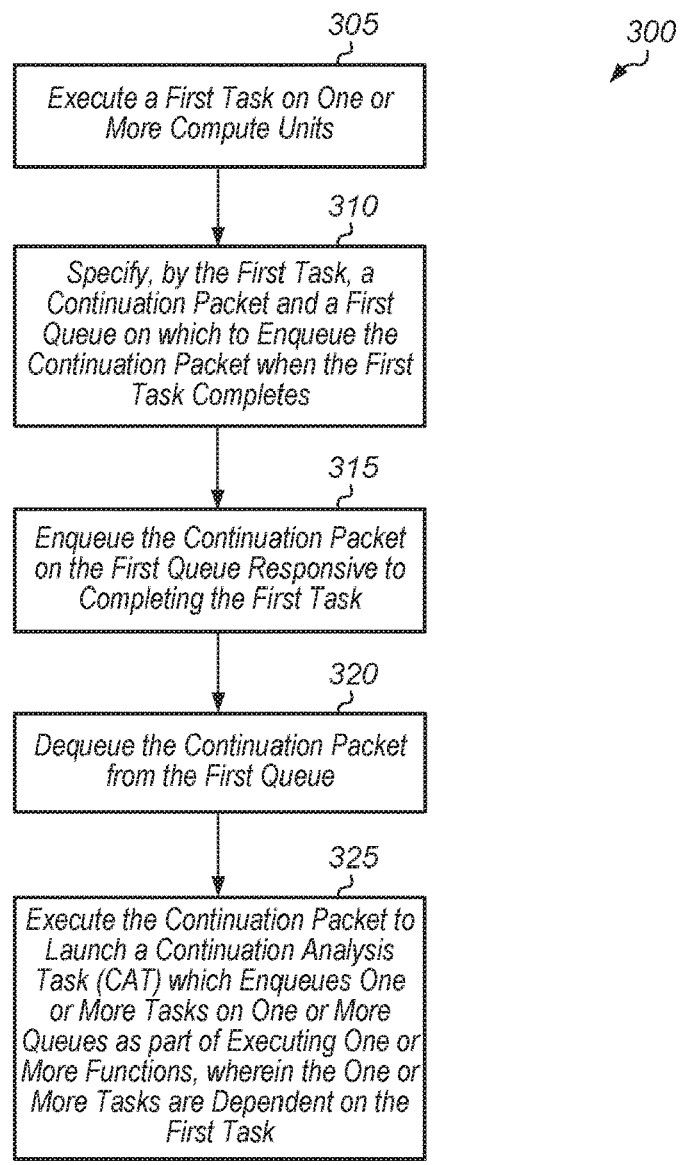
FIG. 3 is a generalized flow diagram illustrating one embodiment of a method for implementing continuation analysis tasks (CATs).

Referring now to FIG. 3, one embodiment of a method 300 for implementing continuation analysis tasks (CATs) is shown. For purposes of discussion, the steps in this embodiment and those of FIGS. 4-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

A system executes a first task on one or more compute units (block 305). The first task specifies a continuation packet and a first queue on which to enqueue the continuation packet when the first task completes (block 310). The system enqueues the continuation packet on the first queue responsive to completing the first task (block 315). In one embodiment, the system includes a plurality of compute units, one or more command processors, and a plurality of queues. In one embodiment, for a given queue, the packets stored on the given queue are processed in order by a corresponding command processor. However, packets enqueued on different queues are not necessarily processed in order with respect to packets on other queues. Next, a first command processor dequeues the continuation packet from the first queue (block 320). Then, the first command processor executes the continuation packet to launch a continuation analysis task (CAT) which enqueues one or more tasks on one or more different queues as part of executing one or more functions, wherein the one or more tasks are dependent on the first task (block 325). It is noted that a continuation packet that causes a CAT to be launched can also be referred to as a "CAT packet". In one embodiment, the CAT discovers that multiple tasks have been unblocked and attempts to enqueue all of these tasks, with each task possibly being enqueued on a different queue. In general, the one or more tasks can include a second task which is enqueued on a given queue. In one embodiment, the given queue is different from the first queue. In another embodiment, the given queue is the same queue as the first queue. In one embodiment, the CAT identifies a specific queue for enqueuing the second task. After block 325, method 300 ends.

In one embodiment, the one or more functions performed by the CAT include determining if one or more dependencies have been satisfied which allow the second task (and optionally one or more other tasks) to be enqueued on the given queue. In this embodiment, the first command processor is configured to enqueue the second task on the given queue responsive to determining that the one or more dependencies have been satisfied. In another embodiment, the one or more functions performed by the CAT include determining a load balance status of the plurality of compute units and selecting a queue, which corresponds to a given compute unit, for enqueuing the second task responsive to determining a load on the given compute unit is below a threshold.

Figure 4:
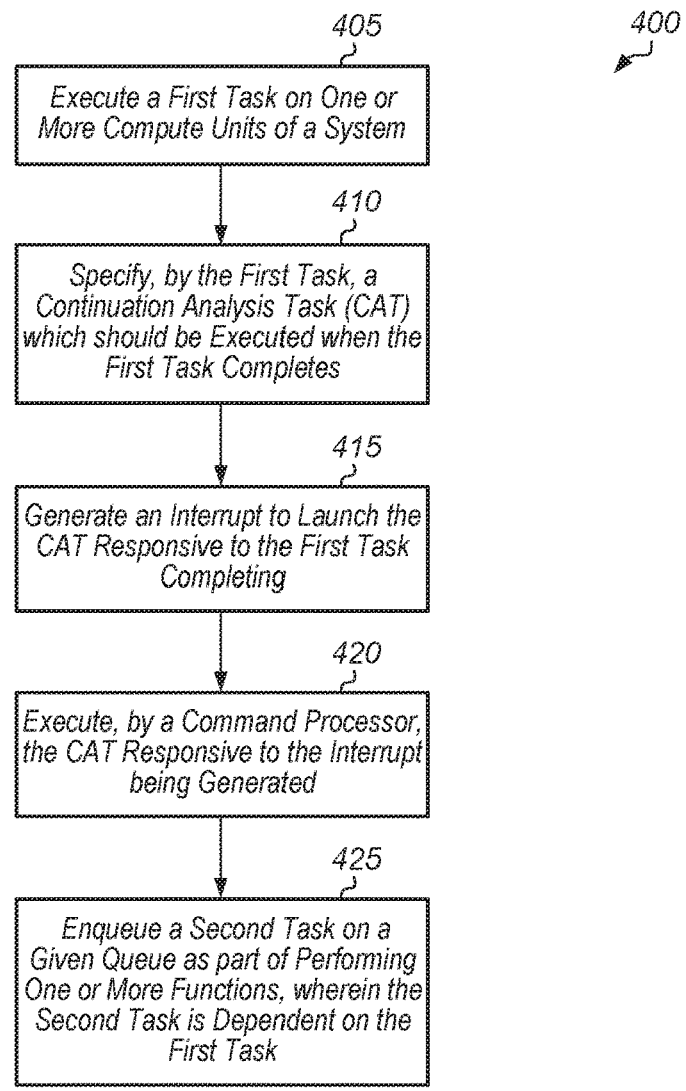
FIG. 4 is a generalized flow diagram illustrating another embodiment of a method for implementing CATs.

Turning now to FIG. 4, another embodiment of a method 400 for implementing continuation analysis tasks (CATs) is shown. A first task executes on one or more compute units of a system (block 405). In one embodiment, the system includes a plurality of compute units, one or more command processors, and a plurality of queues. Also, the first task specifies a continuation analysis task (CAT) which should be executed when the first task completes (block 410). Then, an interrupt is generated to launch the CAT responsive to the first task completing (block 415). In response to the interrupt being generated, a command processor executes the CAT (block 420). Then, the CAT enqueues a second task on a given queue as part of performing one or more functions, wherein the second task is dependent on the first task (block 425). In some embodiments, the CAT enqueues multiple tasks on one or more queues. After block 425, method 400 ends.

Figure 5:
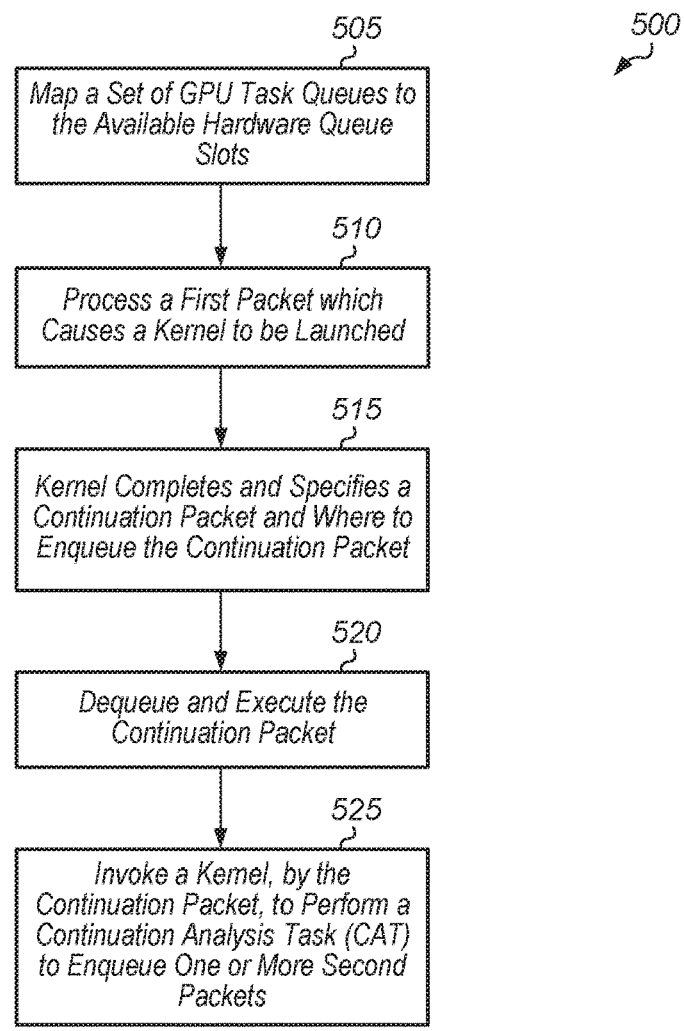
FIG. 5 is a generalized flow diagram illustrating another embodiment of a method for implementing CATs.

Referring now to FIG. 5, another embodiment of a method 500 for implementing continuation analysis tasks (CATs) is shown. A command processor maps a set of GPU task queues to the available hardware queue slots (block 505). The set of GPU task queues can include any number of task queues. In one embodiment, each task queue is monitored by a corresponding command processor of a plurality of command processors. Next, a command processor processes a first packet which causes a kernel to be launched (block 510). In one embodiment, the first packet is an architected queuing language (AQL) packet.

Then, at a later point in time, when the kernel completes, the kernel specifies a continuation packet and where to enqueue the continuation packet (block 515). Next, a command processor dequeues and executes the continuation packet (block 520). The continuation packet invokes a kernel that performs a continuation analysis task (CAT) to enqueue one or more second packets (block 525). In one embodiment, the command processor is a thread running on a multithreaded command processor. The command processor is tightly integrated within the GPU memory system and the GPU's task scheduling and completion interfaces. Accordingly, executing the CATs on the CP is more efficient than performing similar functionality on the CPU host. After block 525, method 500 ends.

Figure 6:
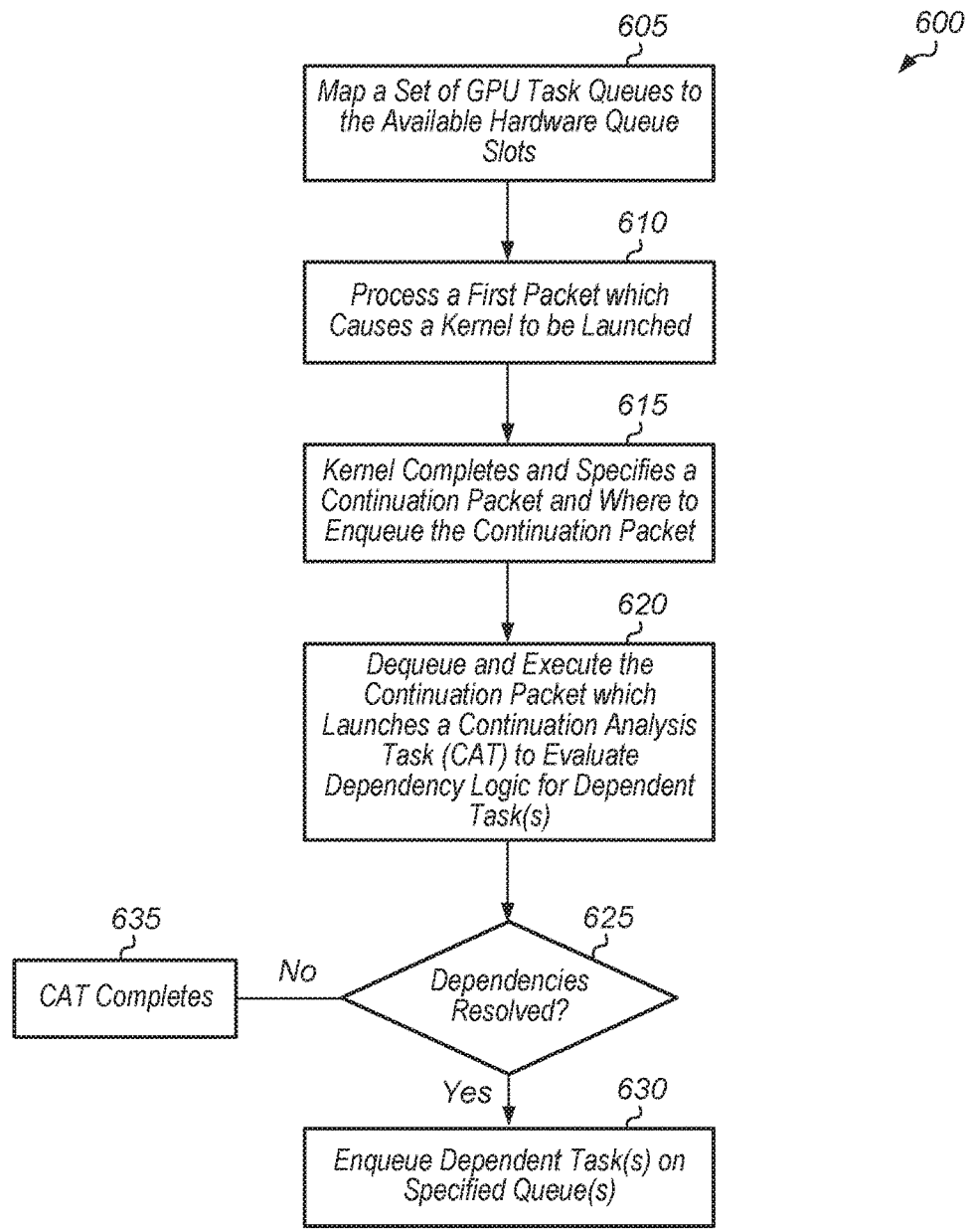
FIG. 6 is a generalized flow diagram illustrating another embodiment of a method for implementing CATs.

Turning now to FIG. 6, another embodiment of a method 600 for implementing continuation analysis tasks (CATs) is shown. A command processor maps a set of GPU task queues to the available hardware queue slots (block 605). The set of GPU task queues can include any number of task queues. In one embodiment, each task queue is monitored by a corresponding command processor of a plurality of command processors. Next, a command processor processes a first packet which causes a kernel to be launched (block 610).

Then, at a later point in time, the kernel completes and specifies a continuation packet and where to enqueue the continuation packet (block 615). Then, at a later point in time, a command processor dequeues and executes the continuation packet which launches a continuation analysis task (CAT) to evaluate dependency logic for dependent task(s) (block 620). If all of the dependencies for the dependent task(s) have been resolved (conditional block 625, "yes" leg), then a command processor enqueues the dependent task(s) on specified queue(s) (block 630). Otherwise, if not all of the dependencies for the dependent task(s) have been resolved (conditional block 625, "no" leg), then the CAT completes without enqueuing the dependent task(s) (block 635). After blocks 630 and 635, method 600 ends.

Figure 7:
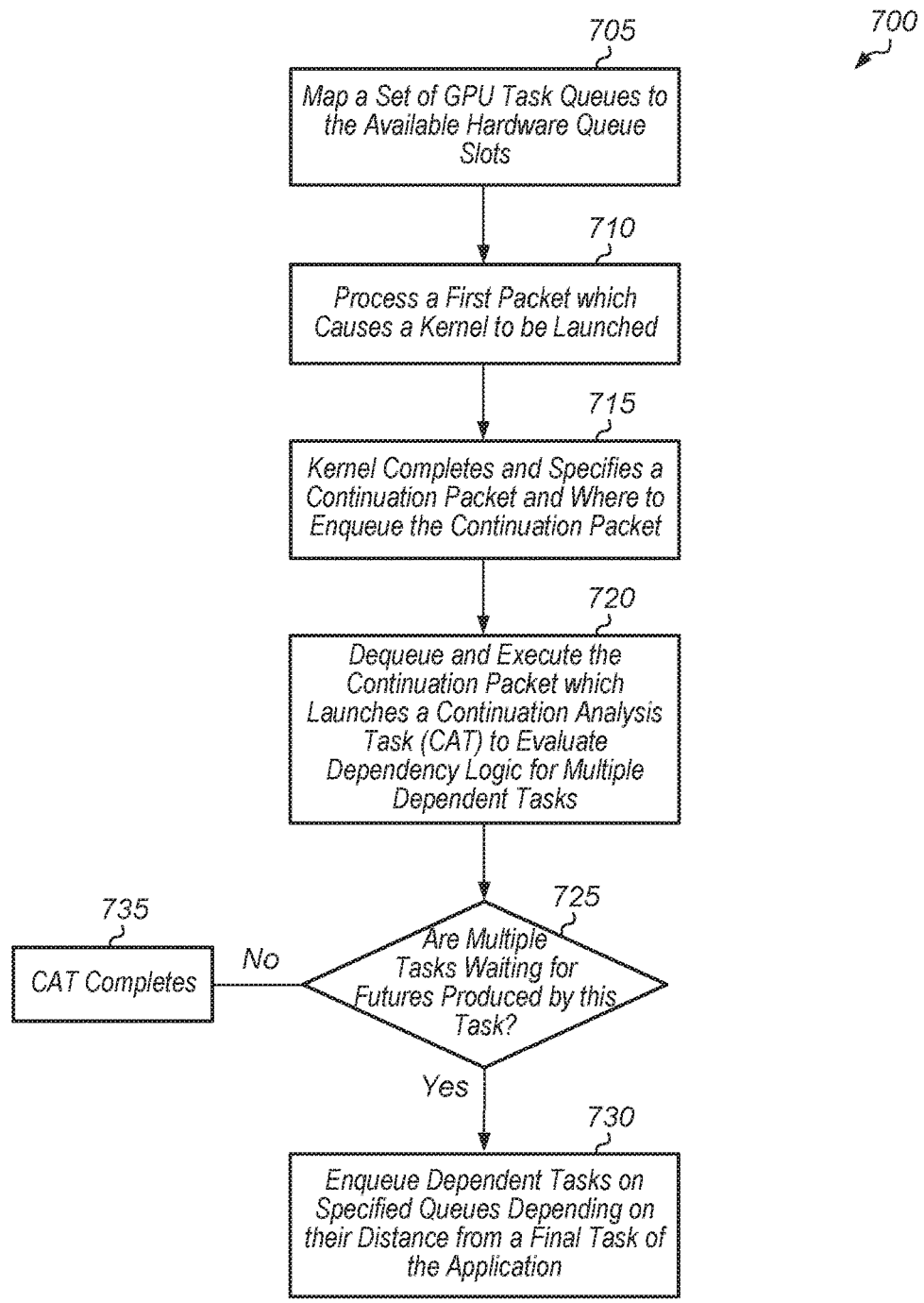
FIG. 7 is a generalized flow diagram illustrating another embodiment of a method for implementing CATs.

Referring now to FIG. 7, another embodiment of a method 700 for implementing continuation analysis tasks (CATs) is shown. A command processor maps a set of GPU task queues to the available hardware queue slots (block 705). The set of GPU task queues can include any number of task queues. In one embodiment, each task queue is monitored by a corresponding command processor of a plurality of command processors. Next, a command processor processes a first packet which causes a kernel to be launched (block 710).

Then, at a later point in time, the kernel completes and specifies a continuation packet and where to enqueue the continuation packet (block 715). Then, at a later point in time, a command processor dequeues and executes the continuation packet which launches a continuation analysis task (CAT) to evaluate dependency logic for multiple dependent tasks (block 720). If multiple tasks are waiting for futures produced by this task (conditional block 725, "yes" leg), then a command processor enqueues the dependent tasks on specified queues depending on their distance from a final task of the application (block 730). In one embodiment, the command processor executes the CAT to optimize the order in which the dependent tasks are enqueued by evaluating the distance each dependent task is from the exit node (i.e., last task) in the task dependency graph or portion of the task dependency graph. By comparing distances from the exit node, the CAT determines which dependent tasks are on the critical path to complete the application and prioritizes these dependent tasks. In one embodiment, the CAT reads GPU performance counters and enqueues the dependent tasks depending on the cache locality of prior tasks.

Otherwise, if there are not multiple tasks waiting for futures produced by this task (conditional block 725, "no" leg), then the CAT completes and enqueues any tasks whose dependencies have been satisfied (block 735). After blocks 730 and 735, method 700 ends. In one embodiment of method 700, the CAT evaluates application specific "futures". Futures is a well-known parallel programming concept that was initially introduced in functional programming. Essentially a future is a proxy for a result that is initially unknown and applications use futures to identify data dependencies between tasks. Once the future variable is produced by the parent task, the child task waiting for the future can proceed. In addition, multiple tasks can depend on a shared future, thus a CAT generated for the command processor could create and enqueue multiple children tasks which depend on the shared future.

Figure 8:
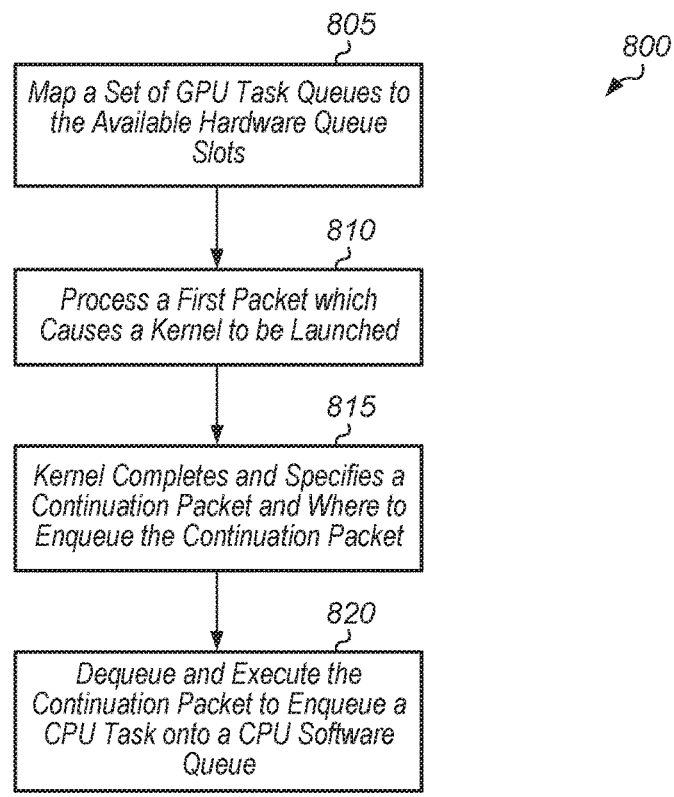
FIG. 8 is a generalized flow diagram illustrating one embodiment of a method for a CAT specifying a CPU task.

Turning now to FIG. 8, one embodiment of a method 800 for a CAT specifying a CPU task is shown. A command processor maps a set of GPU task queues to the available hardware queue slots (block 805). In one embodiment, each GPU task queue is allocated in memory, and the command processor determines the address of each GPU task queue in block 805. Next, the command processor processes a first packet which causes a kernel specified by the first packet to be launched (block 810).

When the kernel completes, the kernel specifies a continuation packet and where to enqueue the continuation packet (block 815). Then, a CPU thread dequeues and executes the continuation packet to enqueue a CPU task onto a CPU software queue (block 820). After block 820, method 800 ends. In one embodiment of method 800, the continuation packet causes a CPU task to be launched that analyzes the results generated by the GPU. In other embodiments, the continuation packet can cause tasks to be launched on other devices, such as other GPUs, DSPs, FPGAs, ASICs, or other devices.

Figure 9:
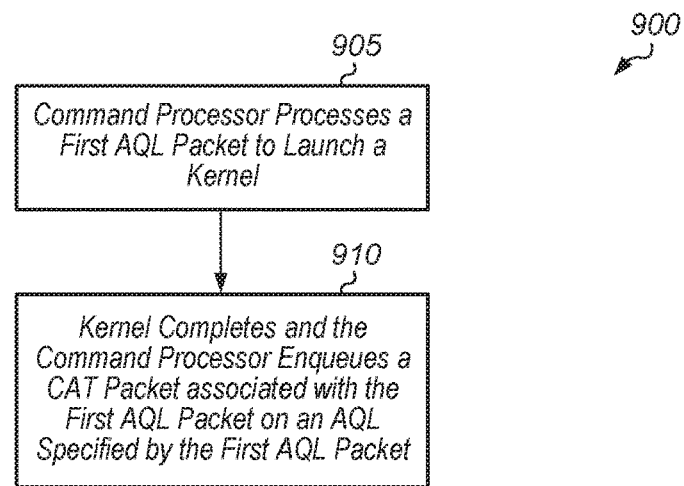
FIG. 9 is a generalized flow diagram illustrating one embodiment of a method for handling kernel completion.

Referring now to FIG. 9, one embodiment of a method 900 for handling kernel completion is shown. A command processor processes a first AQL packet to launch a kernel (block 905). The kernel completes and the command processor enqueues a CAT packet associated with the first AQL packet on an AQL queue specified by the first AQL packet (block 910). The CAT packet and the AQL queue the CAT packet is put on can be any queue, including a queue processed by the GPU or CPU. The execution of the CAT, which can be any packet, can evaluate the dependencies, and if satisfied can enqueue additional AQL packets on the AQL queues that can execute them. This allows the completion of GPU packets to have dependencies that result on more GPU packets being evaluated on the GPU, while also allowing dependencies that result in CPU notification to be executed on the CPU. The computation to perform for dependence analysis can be any action ranging from a fully general kernel, to dedicated packets processed by an agent dispatch AQL queue implemented on the GPU or CPU. After block 910, method 900 ends.

In various embodiments, program instructions of a software application are used to implement the methods and/or mechanisms previously described. The program instructions describe the behavior of hardware in a programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of compute units;
one or more command processors; and
a plurality of queues;
wherein the system is configured to:
execute a first task on one or more of the plurality of compute units;
specify, by the first task, a continuation packet and a first queue on which to enqueue the continuation packet when the first task completes;
enqueue the continuation packet on the first queue responsive to completing the first task; and
dequeue and execute, by a first command processor, the continuation packet, wherein the continuation packet causes one or more tasks, including a second task, to be enqueued on one or more of the plurality of queues, wherein the one or more tasks are dependent on the first task;
wherein the first command processor is configured to enqueue the second task on a given queue responsive to determining that one or more dependencies have been satisfied which allow the second task to be enqueued on the given queue, and wherein the one or more tasks specify the given queue for enqueuing the second task.

2. The system as recited in claim 1, further comprising:
determining a load balance status of the plurality of compute units; and
selecting a queue corresponding to a first compute unit for enqueuing the second task responsive to determining a load on the first compute unit is below a threshold.

3. The system as recited in claim 1, wherein the system comprises a graphics processing unit (GPU) and a central processing unit (CPU), and wherein the first command processor is a multithreaded command processor which is integrated within the GPU and task scheduling and completion interfaces of the GPU.

4. The system as recited in claim 1, wherein packets stored on each queue of the plurality of queues are processed in order.

5. The system as recited in claim 1, further comprising a central processing unit (CPU), wherein the CPU dequeues and executes the continuation packet to cause a second task to be enqueued on a CPU software queue.

6. A method comprising:
executing a first task on one or more compute units;
specifying, by the first task, a continuation packet and a first queue on which to enqueue the continuation packet when the first task completes;
enqueuing the continuation packet on the first queue responsive to completing the first task; and
dequeuing and executing, by a first command processor, the continuation packet, wherein the continuation packet causes one or more tasks, including a second task, to be enqueued on one or more queues, wherein the one or more tasks are dependent on the first task;
wherein the first command processor is configured to enqueue the second task on a given queue responsive to determining that one or more dependencies have been satisfied which allow the second task to be enqueued on the given queue, and wherein the one or more tasks specify the given queue for enqueuing the second task.

7. The method as recited in claim 6, further comprising:
determining a load balance status of the plurality of compute units; and selecting a queue corresponding to a first compute unit for enqueuing the second task responsive to determining a load on the first compute unit is below a threshold.

8. The method as recited in claim 6, wherein the first command processor is a multithreaded command processor which is integrated within a graphics processing unit (GPU) and task scheduling and completion interfaces of the GPU.

9. The method as recited in claim 6, wherein packets stored on each queue of the plurality of queues are processed in order.

10. The method as recited in claim 6, further comprising dequeuing and executing, by a central processing unit (CPU), the continuation packet to cause a second task to be enqueued on a CPU software queue.

11. An apparatus comprising:
one or more command processors; and
a plurality of queues;
wherein the apparatus is configured to:
  execute a first task on one or more compute units;
  specify, by the first task, a continuation packet and a first queue on which to enqueue the continuation packet when the first task completes;
  enqueue the continuation packet on the first queue responsive to completing the first task; and
  dequeue and execute, by a first command processor, the continuation packet, wherein the continuation packet causes one or more tasks, including a second task, to be enqueued on one or more of the plurality of queues, wherein the one or more tasks are dependent on the first task;
wherein the first command processor is configured to enqueue the second task on a given queue responsive to determining that one or more dependencies have been satisfied which allow the second task to be enqueued on the given queue, and wherein the one or more tasks specify the given queue for enqueuing the second task.

12. The apparatus as recited in claim 11, wherein the apparatus is further configured to:
determine a load balance status of the plurality of compute units; and
select a queue corresponding to a first compute unit for enqueuing the second task responsive to determining a load on the first compute unit is below a threshold.

13. The apparatus as recited in claim 11, wherein the apparatus comprises a graphics processing unit (GPU) and a central processing unit (CPU), and wherein the first command processor is a multithreaded command processor which is integrated within the GPU and task scheduling and completion interfaces of the GPU.

14. The apparatus as recited in claim 11, wherein packets stored on each queue of the plurality of queues are processed in order.

15. A system comprising:
a plurality of compute units;
one or more command processors; and
a plurality of queues;
wherein the system is configured to:
  execute a first task on one or more of the plurality of compute units;
  specify, by the first task, a continuation packet and a first queue on which to enqueue the continuation packet when the first task completes;
  enqueue the continuation packet on the first queue responsive to completing the first task; and
  dequeue and execute, by a first command processor, the continuation packet, wherein the continuation packet causes one or more tasks to be enqueued on one or more of the plurality of queues, wherein the one or more tasks are dependent on the first task;
wherein the first command processor is a multithreaded command processor which is integrated within a GPU and task scheduling and completion interfaces of the GPU.

16. A method comprising:
executing a first task on one or more compute units;
specifying, by the first task, a continuation packet and a first queue on which to enqueue the continuation packet when the first task completes;
enqueuing the continuation packet on the first queue responsive to completing the first task; and
dequeuing and executing, by a first command processor, the continuation packet, wherein the continuation packet causes one or more tasks to be enqueued on one or more queues, wherein the one or more tasks are dependent on the first task;
wherein the first command processor is a multithreaded command processor which is integrated within a GPU and task scheduling and completion interfaces of the GPU.

* * * * *